FM STEREOPHONIC MULTIPLEX RECEIVER HAVING AUTOMATIC DISABLING MEANS FOR THE SUBCARRIER CHANNEL

Filed Sept. 27, 1961

INVENTOR.
JOHN H. O'CONNELL
BY Eugene M. Whitacre
Attorney

United States Patent Office
3,170,040
Patented Feb. 16, 1965

3,170,040

FM STEREOPHONIC MULTIPLEX RECEIVER HAVING AUTOMATIC DISABLING MEANS FOR THE SUBCARRIER CHANNEL

John H. O'Connell, Franklin Park, N.J., assignor to Radio Corporation of America, a corporation of Delaware Filed Sept. 27, 1961, Ser. No. 141,104
10 Claims. (Cl. 179—15)

The present invention relates to stereo multiplex radio signal receivers, and more particularly to compatible stereo multiplex frequency-modulation radio receivers which operate in response to both monophonic and stereophonic signal information on a single modulated carrier wave.

In such receivers, under the present accepted method of broadcasting, the carrier wave is frequency-modulated as for conventional monophonic or signle-channel operation by the sum of two modulating audio-frequency signals, such as two stereophonically-related conventional A and B or L and R signals, as a single modulating signal in the usual manner for FM broadcast and compatible reception by conventional receivers. However, in the multiplex system, the carrier wave further is simultaneously provided with stereophonic information effective for signal separation, in the form of a modulating suppressed-carrier subcarrier signal which is amplitude-modulated with the difference of the two stereophonically related signals to be transmitted.

The compatible composite stereophonic signal at the multiplex output circuit or terminal of the frequency-modulation detector of the multiplex receiver may thus be composed of the main frequency-modulation signal component $(A+B)$ or $(L+R)$, which is the compatible signal used by an unmodified or conventional frequency-modulation receiver, a 19 kc. (kilocycles per second) pilot subcarrier signal, and the difference-frequency $(A-B)$ or $(L-R)$, signal that is an AM double-sideband suppressed-carrier signal at 38 kc., the second harmonic of the pilot subcarrier. The sum and difference matrixing in conjunction with the AM suppressed-carrier subchannel permits a maximum of 90% modulation of the main carrier either by the sum $(L+R)$ modulation audio frequency signal itself, or the difference $(L-R)$ modulation-signal suppressed-carrier subchannel signal. The phase and frequency response of both the "sum" and "difference" signal channels are substantially the same over an audio-frequency range of 50–15,000 cycles (cycles per second) for example, and channel separation of 30 db can be attained.

In addition it is contemplated, in accordance with the present method of broadcasting, to provide SCA (Subsidiary Communications Authorization) background music or program material in a second subcarrier signal channel, that may be on a subcarrier frequency of 67 kc. and that can modulate the main carrier up to 10% with sidebands of approximately 8 kc. on each side, in an upper band between 59 kc. and 75 kc.

There are many existing frequency-modulation receivers in use that can be or are arranged for adaptation to stereophonic signal translation and reproduction by the provision of multiplex signal output connection means at the frequency-modulation detector and preceding the de-emphasis circuit. A stereophonic multiplex unit for separating and deriving the two stereophonically-related signals from a compatible stereophonic signal is thus desirable and can be made integral with and part of new receivers or applied as an adapter unit to existing receivers.

It is therefore an object of this invention to provide a simplified low-cost FM stereo reception or signal-translating unit that can be integrated into or connected with an FM radio receiver for deriving stereophonic signal information therefrom in response to received stereophonic signals.

With the present system, the compatible composite stereophonic signal at the multiplex output circuit or terminal of the frequency-modulation detector, as hereinbefore referred to, is applied to the stereo multiplex unit which operates to separate the subcarrier or stereophonic information with a suitable highpass or bandpass filter means after which the difference $(L-R)$ component is demodulated, by suitable matrix circuitry which follows. The demodulated subcarrier signal is subtracted from and added to the sum signal $(L+R)$ component to obtain separate stereophonically-related or L and R signals in two separate stereophonic signal output channels.

When a frequency modulation station is not transmitting a pilot signal (19 kc.) in order to broadcast monophonic or single-channel program material, it is desirable to automatically disable the subcarrier or $(L-R)$ stereo channel in the receiver. This feature is particularly important for stations which transmit SCA subcarriers, as any AM modulation of the subcarrier may appear as crosstalk in the signal output of the stereo-multiplex unit. The reason is that, in the absence of a pilot signal, the highpass or bandpass signal means in the subcarrier channel provides a possible path for any SCA signal to come through to the subcarrier detector. This also includes ignition noise, impulse noise, and thermal noise signals, all of which may get through the bandpass filter for the $(L-R)$ subcarrier sidebands if the pilot subcarrier signal is off or not present, as with monophonic broadcast FM. These noise signals will then be detected by the subcarrier detector and may pass through the matrix circuitry and appear at the stereo channel output circuits along with the stereophonically-related and separated signals.

It is therefore a further object of this invention to provide an improved stereophonic multiplex unit for a frequency-modulation radio receiver which improves the signal-to-noise ratio thereof in operation and which provides monophonic operation automatically in the absence of a pilot or subcarrier signal.

It is also a further and important object of this invention to provide an improved stereophonic multiplex adaptor unit for use with an FM radio detector at the multiplex output terminal thereof which will automatically disable the stereo information translation means thereof in the absence of a pilot subcarrier signal, thereby to cut off undesired noise transmission through said channel and to permit automatic monophonic signal transmission and operation of the receiver.

In accordance with a preferred embodiment of the invention, a cathode-follower signal amplifier or amplifier stage is provided in connection with the multiplex signal output circuit of a main frequency-modulation detector in a frequency modulation receiver, and effectively three signal translating channels are provided in connection with this amplifier stage. For example, one channel is tuned to the 19 kc. pilot subcarrier signal and includes a frequency-doubler stage which is coupled to apply the restored 38 kc. subcarrier signal to the subcarrier detector means which may comprise one or more diode elements. A second channel including a filter circuit for the subcarrier sidebands, is provided with a cathode-follower ouput connection from this amplifier stage to the subcarrier diode detector means, whereby the subcarrier sidebands are added to the subcarrier signal and applied therewith to said detector means.

Two separate stereo output circuits or channels for the L and R signals are coupled to the subcarrier diode detector, either directly in the case of two diodes, or indirectly through a phase-splitter tube or the like in the case of a single diode. To these output circuits are connected the separate signal translating and amplifying means and the channel terminal loud-speaker means for the receiver.

The third signal translating channel from the cathode-follower stage or amplifier, which may be considered as a signal-separation or channel-divider stage, is the sum or modulation (*L*+*R*) audio-frequency circuit for conveying this signal to both of the said stereo output circuits for matrixing and final signal separation. This third signal translating circuit or channel may be called the sum-signal channel and is provided by a cathode-follower output connection of relatively low impedance and a circuit connection therefrom to both L and R channels. By making this channel or its signal source of relatively low impedance to system ground for the receiver, stereo crosstalk between the L and R signal channels through this common source is minimized or prevented.

Since both the pilot subcarrier signal and the subcarrier sidebands are applied to the subcarrier diode detector, and the main or monophonic (*L*+*R*) audio-frequency signal is conducted from the channel divider stage to the stereo output circuits following the subcarrier diode detector, the latter may be cut off, in accordance with the invention, to prevent signal flow therethrough and hence the possibility of any SCA signal, ignition noise, impulse noise or thermal noise signals from passing through to the matrix and output circuits.

Further in accordance with the invention, this signal cut off is provided by applying a D.-C. voltage large or high enough to reverse-bias the subcarrier diode detector against the passage of any signal coming through the highpass or bandpass filter in the absence of the pilot signal. When the (19 kc.) pilot signal is transmitted or received, the amplitude of the resultant or reproduced (38 kc.) subcarrier signal is made large enough to overcome the reverse bias voltage and thus permit the subcarrier detector to operate.

This system cuts off noise transmission through the (*L*—*R*) subcarrier sideband channel entirely automatically and at the same time cuts off noise through the pilot subcarrier channel having the 19 kc. and 38 kc. filter tuned circuitry. Thus the receiver may respond automatically to monophonic signals when the pilot signal is cut off and only the monophonic L+R signal then flows through to the output circuits equally and monophonically.

The signal translating system provided by the stereo multiplex unit thus improves the signal-to-noise ratio and gives monophonic operation automatically through the use of a subcarrier channel diode (*L*—*R*) detector, each diode element of which is reverse-biased to a degree to prevent response to peaks of noise and like unwanted signals when the pilot subcarrier signal is off. The diode signal input coupling means, such as a coupling transformer, is adjusted (in turns ratio for example) to attain a subcarrier input signal amplitude sufficient to overcome the reverse bias, and to be larger or higher than the largest or highest-amplitude sideband signal.

It is therefore an object of this invention to provide an improved frequency-modulation stereophonic multiplex unit or adaptor for use with existing monophonic or conventional frequency-modulation radio receivers, which effectively provides both monophonic and stereophonic signal output automatically in response to the type of signal received.

The invention will however be better understood from the following description, when considered in connection with the accompanying drawings, and its scope is pointed out in the appended claims.

Figures 1, 2, 3:
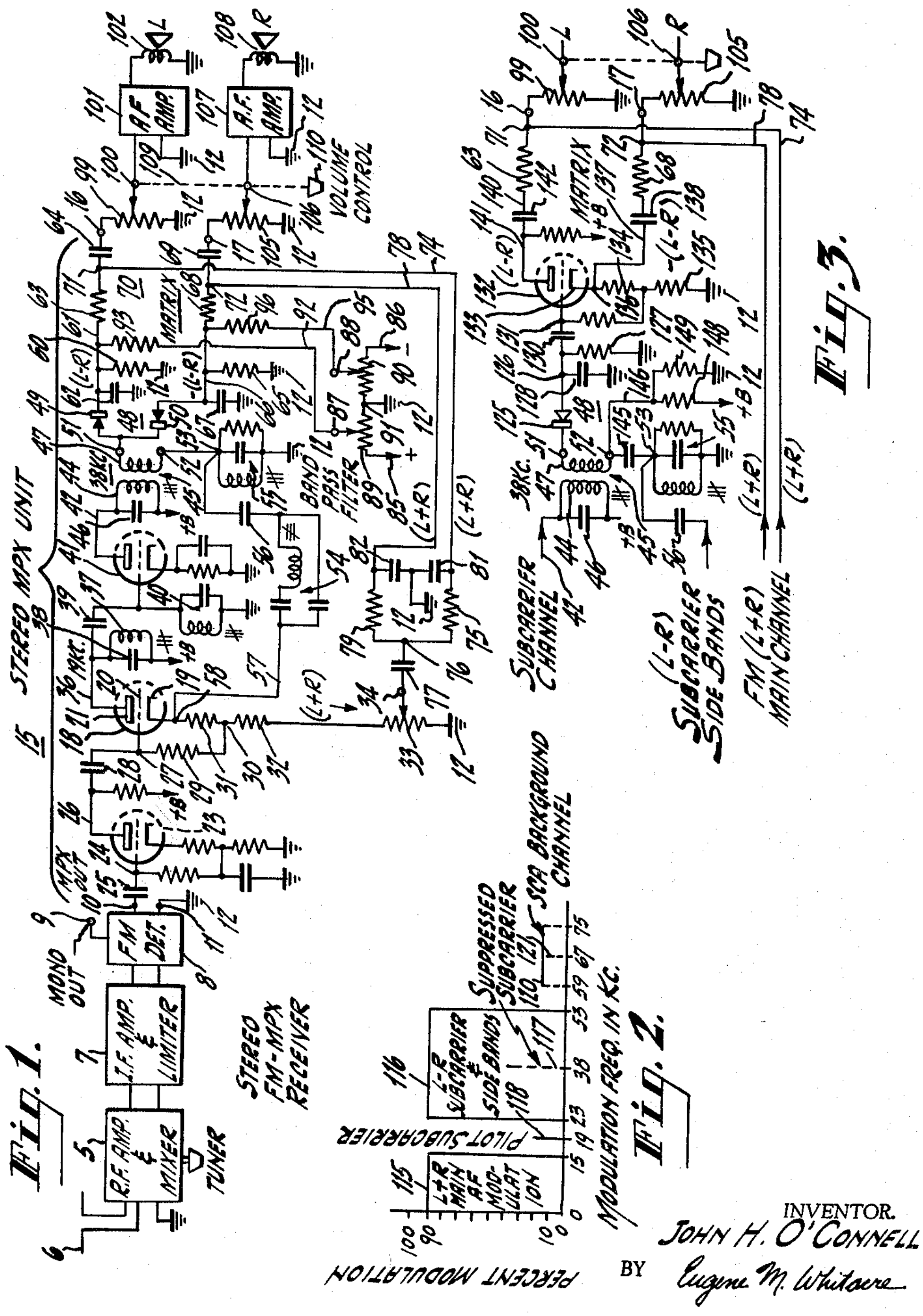
FIGURE 1 is a schematic circuit diagram of a stereo FM-multiplex radio receiver provided with a stereo multiplex unit embodying the invention.
FIGURE 2 is a graph indicating the range of frequency spectrum and modulation components of a composite modulation signal as applied to the stereo multiplex unit of the circuit of FIGURE 1, with reference to certain operating features of the invention.
FIGURE 3 is a further schematic circuit diagram of a portion of the stereo multiplex unit of FIGURE 1, showing a modification thereof.

Referring to the drawings and more particularly to FIGURE 1, the receiver circuit shown is representative of any frequency modulation receiver which may be adapted for stereophonic multiplex operation. In this respect it is provided with the usual R-F amplifier and mixer 5 tunable through the frequency-modulation band of 88 to 108 mc., and coupled to antenna means 6 and the usual I-F amplifier and limiter 7 which is followed by a suitable discriminator or like FM detector 8. The latter has the usual monophonic output terminal or circuit 9 to which deemphasis has been applied, and a multiplex output terminal or circuit 10 which is also normally provided in such receivers. The common output circuit terminal 11 for the FM detector is connected to receiver or system ground 12 as indicated.

Connected with the multiplex output circuit or terminals 10–11 of the FM detector, is stereo multiplex unit 15 for deriving two stereophonically-related (L and R) or like modulation signals from the composite signal at the FM detector output terminals. This unit may be added to existing receivers or may be built integrally therewith during manufacture, and provides, at two stereo or channel output terminals 16 and 17, the separated modulation component signals such as the L and R stereo signals in the present example. Common ground connections 12 are likewise provided for the output terminals 16 and 17 as indicated.

In the stereo multiplex unit 15, a cathode-follower signal amplifier or amplifier stage is provided in connection with an amplifier tube 18 having a cathode 19, a control grid 20 and an output anode 21. In the present example this may be half of a double triode tube for economy in construction. This stage may be coupled directly with the detector output terminals 10–11, but in the present example is preferably coupled therewith through an intermediate signal amplifier stage comprising a triode amplifier tube 23 which may be the other half of the double triode. This tube has an input grid circuit 24 coupled to the terminal 10 through a coupling capacitor 25 and an output plate circuit 26 coupled to the input grid 20 of the cathode-follower amplifier stage through a grid circuit 27 and a coupling capacitor 28 as indicated. The grid circuit 27 includes a grid resistor 29 connected with a tap 30 on the cathode circuit of the tube 18. This cathode circuit also includes three series-connected cathode-resistor elements 31, 32 and 33, the last being connected to system ground 12 as indicated and provided with a variable output contact 34.

The plate or anode circuit 36 of the amplifier tube 18 is tuned to the pilot subcarrier signal, which is 19 kc. in the present example, through a plate-circuit variable inductor 37 and shunt tuning capacitor 38 therefor. The anode is coupled through a capacitor 39 with a tuned input grid circuit 40 for a frequency-doubler amplifier or amplifier stage provided by a triode amplifier tube 41 the output anode circuit 42 of which is tuned to the second harmonic of the pilot subcarrier signal at 38 kc. as indicated. The tuning means in the output plate circuit 42 of the frequency-doubler stage includes the primary winding 44 of a coupling transformer 45 and a shunt tuning capacitor 46 for the winding 44 as shown. This winding is inductively variable as indicated.

The secondary winding 47 of the transformer 44 provides an input circuit element for the subcarrier diode detector 48 which includes two diode elements 49 and 50 connected in polarity opposition and in parallel relation, to the high signal potential terminal 51 of the secondary winding 47. The low signal potential terminal 52 of the winding 47 is connected to an intermediate terminal 53 of a bandpass filter circuit comprising a series filter section 54 and a shunt filter section 55, the latter being connected between the terminal 53 and system ground, 12 whereby the input winding 47 for the detector is provided with a conductive circuit connection to ground through the section 55 as indicated.

The two filter sections 54 and 55 are coupled through a series filter capacitor element 56, and the series filter section 54 is connected through a filter circuit lead 57 with a cathode follower output terminal 58 between the cathode 19 and the cathode resistor element 31.

The diode detector element 49 is provided with a diode output load resistor 60 and shunt signal bypass capacitor 62 therefor, connected between a diode output circuit lead 61 and system ground 12. The output circuit lead 61 is connected through a series resistor 63 and an output coupling capacitor 64 with the stereo or sound channel output terminal 16, as indicated.

In a similar manner the diode detector element 50, in reverse polarity arrangement with respect to the element 49, is provided with a shunt output load resistor 65 and shunt signal bypass capacitor 67 therefor, connected between a diode output circuit lead 66 and system ground 12. The output lead 66 is connected through a series resistor 68 and output coupling capacitor 69 with the stereo or sound channel output terminal 17.

The resistors 63 and 68 are effectively part of a matrixing and de-emphasis circuit 70 having terminals 71 and 72 respectively at the output circuit leads 61 and 66. These terminals are located between the series resistor and capacitor elements for this circuit as will be seen. The terminal 71 is connected with a circuit lead 74 which is connected through a series resistor 75 to a terminal 76. The latter is coupled to the output contact 34 of the cathode resistor element 33 through a coupling capacitor 77. In a similar manner, the terminal 72 is connected through a circuit lead 78 and a series resistor 79 with the terminal 76 and thence through the coupling capacitor 77 to the contact 34. Between the leads 74 and 78 and effectively between the terminals 71 and 72 are connected two bypass, de-emphasis capacitors 81 and 82 to ground 12. With the resistor elements 63 and 68 respectively, the capacitors 81 and 82 provide the complete de-emphasis network for the two stereophonic signal output channels as represented by the circuits connected with the terminals 16 and 17. Also the resistor elements 75 and 79, with the capacitors 81 and 82, provide de-emphasis for the $(L+R)$ signal to produce the FM main channel.

Between the receiver system ground 12 and positive and negative bias voltage supply leads 85 and 86, from any suitable source (not shown), are connected means for applying a reverse bias to the subcarrier diode detector 48. Since the detector comprises two diode elements 49 and 50 connected in reverse polarity relation to each other, two separate and opposite bias voltages are used with respect to system ground. In the present example these bias voltages are provided at the contacts 87 and 88 of two potentiometer resistor elements 89 and 90 respectively, connected serially between the leads 85 and 86 with their junction 91 connected to common ground 12 as shown.

The contact 87 is connected through a bias supply lead 92 and a series isolating resistor 93 with the output circuit lead 61 for the diode element 49 and in a positive polarity relation to ground, so that the diode element 49 is reverse-biased by the voltage established between the contact 87 and the ground terminal 91. Likewise the contact 88 is connected through a bias supply lead 95 and a series isolating resistor 96 with the output circuit lead 66 for the diode element 50 and in a polarity relation with respect to ground and the terminal 91 so that the diode element 50 is also reverse-biased. Any other suitable means for applying a reverse bias to each of the diode elements may be used.

The radio receiver signal translating system includes suitable means connected with the terminals 16 and 17 of the stereo multiplex unit to amplify and reproduce the two channel signals, which are here assumed to be the left and right, or L and R, audio-frequency signals which are stereophonically-related. To this end, the terminals 16 is connected to system ground through an output volume-control potentiometer resistor 99 having an output volume control contact 100 connected with a suitable audio frequency channel amplifier 101, as indicated, which has a common ground return connection 12 and is connected to drive a left-channel output loudspeaker 102.

Likewise the output terminals 17 is connected to system ground 12 through a second channel volume-control potentiometer resistor 105 having an output volume control contact 106 connected to the second channel amplifier means 107, having a common ground return connection 12 and a right channel output loudspeaker 108 connected therewith as shown. As is customary, the volume-control means are gang-connected for joint operation as indicated by the dotted line connection 109 and the common volume control knob represented at 110 in connection therewith. This dual-channel signal translating circuit and sound-reproducing output means therefore is representative of any suitable means of this type normally provided in a stereophonic sound reproducing system.

Referring now to FIGURE 2 along with FIGURE 1, the operation of the multiplex unit in the receiver may now be considered. The composite signal at the multiplex output terminals 10–11 of the FM detector 8 when the receiver is responding to compatible stereophonic signals, may be represented by the graph of FIGURE 2 drawn with reference to the FM carrier modulation frequency in kilocycles along the X axis and percentage modulation along the Y axis which also indicates relative amplitudes of subcarrier signals. It will be seen that the total signal is composed of an $(L+R)$ component 115 which may provide as much as 90% modulation and an $(L-R)$ double-sideband suppressed-carrier AM signal component 116 which may also modulate the carrier up to 90% as indicated, but 180° out of phase with the modulation provided by the main modulation component 115. In other words when the component 115 is maximum the component 116 is minimum.

It will be noted that it is assumed that the audio-frequency modulation will extend from zero to 15 kc. As a practical matter it is known that the modulation frequency actually may extend between 50 cycles and slightly less than 15 kc., depending upon the fidelity of the equipment used for modulating the system. The restored suppressed-carrier signal indicated by the dotted line 117 is at 38 kc. and is the second harmonic of the pilot carrier represented at 118 with a frequency of 19 kc. The sidebands of the suppressed subcarrier extend substantially from 23 kc. to 53 kc. as indicated, thereby to provide for substantially the full 15 kc. modulation referred to.

The possible SCA background music channel is indicated by the block 120 and extends 8 kc. on either side of a 67 kc. sub-carrier signal indicated by the dotted line 121.

The three components of the multiplex output signal, that is, the $(L+R)$ audio-frequency component 115, the 19 kc. pilot subcarrier signal 118, and the $(L-R)$ subcarrier sidebands 116 are conveyed forwardly through the stereo multiplex unit 15 in three signal conveying or translating channels which are provided therein preceding the multiplex circuit 70 and the output terminals 16 and 17 for the separated L and R signals. The three signal translating channels are provided in connection with the channel-divider cathode-follower stage comprising the amplifier tube 18, and the first is that provided through the plate circuit 36 for the 19 kc. pilot subcarrier signal and the frequency-doubler stage comprising the tube 41 which is coupled to apply the restored 38 kc. subcarrier signal to the subcarrier detector 48 comprising the two diode elements 49 and 50.

The second signal translating channel from the cathode-follower stage is connected with the cathode follower output terminal 58 and includes the bandpass filter means 54–55 and its translating circuit connection over to the terminal 52 of the secondary 47 and the subcarrier detector 48. This bandpass filter is tuned to pass the 38 kc. subcarrier with a band width of 30 kc. in the present example, to provide bandpass for the 23–53 kc. sidebands. The sidebands are thus added to the 38 kc. subcarrier supplied through the first channel to the subcarrier detector, and as a result the output circuits 61 and 66 from the diode elements provide the $(L-R)$ and the $-(L-R)$ difference-frequency signal for matrixing with the main modulation $(L+R)$ signal supplied through the third channel.

The third main signal translating channel from the cathode-follower stage is that connected with the cathode resistor 33 which here may be considered to have a resistance of 5000 ohms for example. An output signal is derived from this impedance element through the adjustable contact 34 and is applied equally, through the resistors 75 and 79 and circuit leads 74 and 78, to the matrix circuit terminals 71 and 72 on the output circuits 61 and 66 for matrixing with the difference-frequency signals, thereby to provide the left channel signal at the terminal 16 and the right channel signal at the terminal 17 for application to the separate channel translating and signal reproducing means. By making the $(L+R)$ or main modulation signal source of relatively low impedance through the low resistance cathode-circuit element 33, for example, crosstalk from the left channel at the terminal 71 through the lead 74 and the resistor 75 to the terminal 76 and thence back through the resistor 79 and the lead 78 to the right channel at the terminal 72, is substantially prevented by the relatively low impedance of the common terminal 76 to ground 12. Thus stereo crosstalk between the stereo or L and R signal channels through this common source is minimized or prevented. As indicated hereinbefore, the de-emphasis capacitors 81 and 82 remove $L-R$ sidebands and properly de-emphasize the $L+R$ signal for matrixing at the terminals 71 and 72.

Both the pilot subcarrier signal translated through the tuned stage coupling circuits 37–38, 40 and 44–46, and the subcarrier sidebands translated through the bandpass filter 54–55, are applied to the subcarrier diode detector 48. The main or monophonic $(L+R)$ audio frequency signal is conducted from the channel-divider or cathode-follower stage 18 to the output terminals 16 and 17 directly through the circuit network, including the third-channel circuit leads 74 and 78 and the coupling capacitors 64 and 69. Thus for monophonic signal reception and translation, the input signal from the FM detector flows through the coupling stage 23, the channel-divider stage 18, and thence through the cathode-coupling output connection at the impedance element 33 directly to the output terminals 16 and 17 and equally to both amplifying and reproducing channel means for normal monophonic sound reproduction in response to an applied signal.

Under these conditions, as hereinbefore pointed out, it is desirable to disable the $L-R$ stereo channel, as ignition noise, impulse noise and thermal noise signals may all pass through the bandpass filter circuit provided between the cathode follower output terminal 58 and the detector terminal 52. These noise signals will then be detected by the diode detector 48 and will pass through the matrix circuit 70 and thence to the output terminals 16 and 17 for further amplification and reproduction as sound.

Thus each diode element of the subcarrier-channel diode detector is reverse-biased to a degree to prevent response to the peaks of noise and like unwanted signals when the pilot subcarrier signal is off, as when receiving monophonic broadcast programs. In the present example, the voltages at the terminals 87 and 88 with respect to ground are adjusted to be large enough or high enough to reverse bias each of the diode elements 49 and 50 against the passage of any signal coming through the bandpass filter or through the tuned pilot signal channel when no pilot subcarrier signal is transmitted. Thus the system may operate monophonically.

When the 19 kc. pilot subcarrier signal is transmitted along with the $(L-R)$ sideband stereo information, the amplitude of the reproduced 38 kc. carrier is large enough to overcome the reverse-bias voltage and to permit normal stereo detection and signal matrixing for full stereo sound reproduction. The amplitude of the derived or reproduced 38 kc. subcarrier may be adjusted by any suitable means such as the turns ratio of the windings of the coupling transformer 45 or the signal gain through the amplifier stages represented by the tubes 18 and 41. The matrixing balance is adjusted by varying the amplitude of the added $L+R$ signal through adjustment of the contact 34 on the cathode resistor 33. Thus in accordance with the invention an improved frequency modulation stereophonic multiplex unit or adaptor may be provided for use with existing monophonic or conventional frequency modulation radio receivers which effectively provides both monophonic and stereophonic signal output automatically in response to the type of signal received.

It will be noted that the two separate stereo output circuits or channels, represented by the leads 61 and 66 for the stereo or L and R signals, are coupled to the subcarrier diode detector directly to the two diode elements thereof. However, the stereo multiplex unit or adaptor is not limited to the use of a pair of diode detector elements for its operation. A signal subcarrier diode detector element may be used as shown in the circuit modification of FIGURE 3 wherein like circuit elements are designated by like reference characters as in FIGURE 1.

Referring to FIGURE 3 along with FIGURE 1, it will be seen that the subcarrier diode detector 48 in FIGURE 3 includes a single diode element 125 connected with the secondary winding 47 of the coupling transformer 45 and is provided with an output circuit represented by the output lead 126 across which, to ground, is connected a shunt diode load resistor 127 and signal bypass capacitor 128. The lead 126 is coupled through an output coupling capacitor 130 with the grid input circuit 131 of a phase-splitter amplifier tube 132 having a cathode 133 connected to system ground 12 through two series cathode resistor elements 134 and 135. The cathode terminal 136 is connected through a channel output lead 137 with the output terminal 17. A series coupling capacitor 138 is provided in the lead 137 preceding the de-emphasis resistor 68 and the terminal connection 72 for the channel lead 78. No output coupling capacitors are therefore required.

A second channel output lead 140 is connected with the output plate circuit 141 of the tube 132 through a coupling capacitor 142 preceding the series de-emphasis resistor 63 in connection with the terminal 16 and terminal connection 71 with the channel lead 74. Due to the plate and cathode circuit output connections for stereo channel separation, the $(L-R)$ output signals are 180° out of phase for proper matrixing.

As in the preceding circuit, the subcarrier channel is tuned to apply the 38 kc. carrier to the diode detector 48 and the $L-R$ subcarrier sidebands are applied to the filter circuit which in this case is coupled to the terminal 52 through a coupling capacitor 145. This arrangement is to permit a reverse bias potential to be applied from a supply lead 146 and thence through the secondary 47, to the terminal 51 and the diode 125. The supply lead 146 may be connected to any suitable bias voltage supply source such as a potential divider resistor network. In the present example, this comprises a series voltage-dropping resistor 148 connected between a suitable positive potential source, such as +B, and the lead 146, and from the lead 146 to system ground through a second voltage dropping resistor 149. The relative values of the resistors are such that a desired reverse biasing potential is provided between ground and the lead 146, across the resistor element 149, of sufficient value to cut off the subcarrier detector in the absence of a pilot subcarrier signal, as in the case of the circuit of FIGURE 1.

In the circuit of FIGURE 3, the signal output from the diode detector 125 is applied to the grid circuit of the phase-splitter tube 132 and the $(L-R)$ signal component for the matrix terminal 71 is then derived from the plate circuit connection 140 and the $-(L-R)$ signal component for the matrix terminal 72 is derived from the cathode circuit connection lead 137. The $(L+R)$ matrixing signal is applied through the leads 74 and 78 to the terminals 71 and 72, thereby to provide the separated stereophonically-related L and R or the transmitted dual-channel signals at the output terminals 16 and 17 and the volume-control output terminals 100 and 106 for further translation and reproduction in the receiver system. In all other respects the system construction and operation is the same as described for the circuits of FIGURE 1.

From the foregoing description it will be seen that the stereo multiplex radio signal receiver unit of the present invention may operate in response to both monophonic and stereophonic signal information on a single modulated carrier wave and that in response to monophonic signals the system operates automatically to demodulate such signals with an improved signal-to-noise ratio. Either a single or a double subcarrier diode detector may be utilized in the system in connection with a pilot subcarrier signal channel and a subcarrier sideband channel from a preceding channel-divider cathode-follower stage and followed by a matrixing circuit to which the main modulation or sum modulation signal is applied through a relatively low impedance-to-ground circuit which also may be connected with the channel divider stage by cathode circuit coupling. The stereo multiplex unit is thus of compact and simplified circuitry having a minimum number of components and is adapted to be connected with the multiplex signal output terminals or connection means of any frequency-modulation signal receiver.

What is claimed is:

1. In a frequency-modulation radio receiver, the combination of, means providing a main modulation signal channel and a subcarrier signal channel, a main frequency-modulation detector having a multiplex signal output connection with each of said channels to apply received sum and difference modulation signal components thereto, a reverse-biased diode detector in the subcarrier signal channel for cutting off the signal flow therethrough in the absence of stereo signal information and for effecting automatic operation of the main channel for monophonic signal translation, and means for applying a received subcarrier signal to said diode detector of a magnitude to overcome the reverse bias and to permit subcarrier signal translation through said diode detector and the subcarrier signal channel.

2. In a frequency-modulation radio receiver, the combination of means providing a main modulation signal channel and a subcarrier signal channel, a main frequency-modulation detector having a multiplex signal output connection with each of said channels to apply received sum and difference modulation signal components thereto, a reverse-biased diode detector in the subcarrier signal channel for cutting off the signal flow therethrough in the absence of stereo signal information and for effecting automatic operation of the main channel for monophonic signal translation, means for applying received subcarrier signals to said diode detector of a magnitude to overcome the reverse bias and to permit subcarrier signal translation through said diode detector and the subcarrier signal channel, means including a filter circuit connected between the frequency-modulation detector and the diode detector for applying subcarrier sidebands to said diode detector jointly with the application of subcarrier signals to said diode detector through the subcarrier signal channel, means connected with said diode detector for deriving two difference-signal modulation components from said subcarrier and sideband signals which are substantially 180° apart and in two stereo signal output circuits, and means providing a low-impedance source of sum modulation signals in the main modulation signal channel connected with each of said output circuits to apply matrixing signals thereto and effect stereo signal separation with the difference-signal components therein.

3. In a frequency-modulation radio receiver, the combination with a frequency-modulation detector having a multiplex signal output circuit, of a subcarrier signal channel coupled to said output circuit and including means for deriving two subcarrier modulation signal components 180° out of phase with each other, means for cutting off signal translation through said subcarrier channel in the absence of a received subcarrier signal, a pair of steropheonic signal channel output circuits, and means for applying a main modulation signal component from said frequency-modulation detector output circuit to said stereophonic channel output circuits in parallel relation for monophonic operation in the absence of said subcarrier signal and to matrix with said subcarrier signal components and effect stereophonic signal separation and output to said stereophonic channel output circuits in the presence of said subcarrier signal.

4. In a frequency-modulation radio receiver, the combination with a frequency-modulation detector having a multiplex signal output circuit, of a subcarrier signal channel coupled to said output circuit having a diode detector for deriving a subcarrier modulation signal, a sideband signal translating channel coupled to said frequency-modulation detector output circuit to apply sidebands to the subcarrier signal at said diode detector, means for reverse-biasing said diode detector to cut off signal translation through said subcarrier and sideband translating channels, means connected in said subcarrier signal channel to apply a received subcarrier signal to said diode detector at an amplitude to overcome the reverse bias and to effect signal translation therethrough, means for applying a main signal component from said frequency-modulation detector output circuit to matrix with the diode detector output signals and effect stereophonic signal separation, and a pair of stereophonic signal output circuits coupled with said last-named means for translating separated stereophonic signals therefrom, and the main signal component jointly in the absence of a received subcarrier signal.

5. In a frequency modulation radio receiver, a stereo-multiplex signal translating unit comprising in combination, means providing a main sum modulation signal channel and a subcarrier difference-modulation signal channel, a main frequency-modulation detector having a multiplex signal output connection with each of said signal channels to apply received sum and difference modulation signal components thereto, a subcarrier diode detector connected with the subcarrier signal channel for deriving two difference modulation signal components therefrom, means providing a signal matrixing network having two audio-frequency stereo-channel output circuits, means for applying sum and difference signal components to said matrixing network from said modulation signal channels to effect modulation signal separation and application to said stereo-channel output circuits in the presence of a received subcarrier signal of predetermined amplitude, and means for reverse-biasing said diode detector to cut off said difference signal components from said matrix network in the absence of said subcarrier signal, thereby to apply received sum signal components to said stereo channel output circuits through said matrixing network for monophonic signal operation of said receiver.

6. In a stereophonic multiplex radio receiver, the combination with a frequency-modulation detector having a multiplex signal output circuit, of a pilot subcarrier signal channel including a subcarrier diode detector, means including a filter circuit for translating subcarrier sideband signals from said multiplex signal output circuit to said diode detector, means including a low-impedance signal translating circuit connected between the multiplex output circuit and the subcarrier diode detector output circuit for applying a main sum-signal modulation component to effect signal separation by matrix with the subcarrier modulation signal components from said diode detector, and means for applying a reverse bias to the subcarrier diode detector which is effective in the absence of a pilot subcarrier signal to automatically disable the subcarrier signal and subcarrier sideband translating circuits and to provide automatic monophonic operation of the receiver, said diode detector being reverse-biased to a degree to prevent response to noise signal peaks and like signals in the absence of the pilot subcarrier signal.

7. A multiplex unit for connection with the detector multiplex signal output circuit of a frequency-modulation radio receiver for deriving two modulation signal components therefrom in the presence of a received pilot subcarrier signal and subcarrier sidebands and a single monophonic sum of said modulation signal components therefrom in the absence of said pilot signal, comprising in combination, means providing a tuned pilot subcarrier signal channel, means providing a subcarrier sideband signal channel, means coupling said signal channels with said multiplex signal output circuit for deriving received composite signals therefrom, a subcarrier diode detector coupled to said first and second named signal channels for receiving the subcarrier signal and sidebands to effect demodulation of a subcarrier modulation component representing the difference between said two modulation signal components, means providing a relatively-low-impedance main modulation-signal channel between the multiplex output circuit and the signal output side of said diode detector for effecting signal matrixing and separation of the modulation signal components and monophonic translation of the sum of said modulation signal components, and means for applying a reverse bias to the diode detector for cutting off subcarrier signal and sideband translation in the absence of a pilot subcarrier signal thereby to effect automatic monophonic operation and improved signal-to-noise ratio in the monophonic signal output therefrom.

8. A multiplex unit for use with frequency-modulation radio receivers having a multiplex signal outlet for components including a pilot subcarrier signal with a main modulation signal representing the sum of two audio-frequency modulation signals and subcarrier modulation signal sidebands representing the difference of said two audio-frequency modulation signals, said unit comprising in combination, multiplex signal input circuit means adapted for signal-conveying connection with said signal outlet, means coupled to said input circuit means providing a signal translating channel for each of said signal components, means including a diode detector coupled to the subcarrier and sideband signal channels for deriving the difference subcarrier modulation signal, a matrix and de-emphasis network providing two channel output circuits for said audio-frequency modulation signals coupled to said diode detector and to the main modulation signal channel, and means for applying a reverse bias voltage to said diode detector for cutting off signal flow therethrough from the subcarrier and sideband channels in the absence of a received pilot subcarrier signal thereby automatically to effect monophonic single channel operation with improved noise reduction.

9. A multiplex unit as defined in claim 8, wherein the subcarrier channel includes a frequency-doubler amplifier stage and the sideband channel includes a bandpass filter, and wherein the main modulation-signal channel includes low-impedance coupling means for effectively isolating said two channel output circuits to prevent cross-talk therethrough.

10. A multiplex adaptor unit for connection with the detector multiplex signal output circuit of a frequency-modulation radio receiver to derive stereophonically-related modulation signals therefrom in the presence of a received subcarrier signal and a monophonic sum of said modulation signals therefrom in the absence of said subcarrier signal, comprising in combination, signal input circuit means, means coupled therewith providing a tuned subcarrier signal channel including a frequency-doubler amplifier stage preceded by a signal channel-divider stage having a tuned output circuit for the subcarrier signal and two cathode follower output circuits, means including a bandpass filter providing a subcarrier sideband signal channel coupled to one of said cathode-follower output circuits, a subcarrier diode detector coupled to said first and second named signal channels for receiving the subcarrier signal and sidebands to effect demodulation of a subcarrier modulation component representing the difference between said stereophonically-related modulation signals, means providing a main modulation signal channel of relatively low impedance coupled between the other of said cathode-follower circuits and the signal output side of said diode detector for effecting signal matrixing and separation of the stereophonically-related modulation signals and monophonic translation of the sum of said modulation signals, and means for applying a reverse bias to the diode detector for cutting off subcarrier signal and sideband translation in the absence of a subcarrier signal thereby to effect automatic monophonic operation and improved signal-to-noise ratio in the monophonic signal output therefrom.

References Cited in the file of this patent

UNITED STATES PATENTS 2,233,339 Brown ---------------- Feb. 25, 1941

FOREIGN PATENTS 216,047 Austria ---------------- July 10, 1961